United States Patent
Eirinberg et al.

(10) Patent No.: US 11,443,306 B2
(45) Date of Patent: Sep. 13, 2022

(54) THIRD-PARTY RESOURCE AUTHORIZATION

(71) Applicant: Snap Inc., Santa Monica, CA (US)

(72) Inventors: Dylan Shane Eirinberg, Venice, CA (US); Matthew Colin Grantham, Toronto (CA); Patrick Mandia, Venice, CA (US); David Whyte, Toronto (CA); William Wu, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 267 days.

(21) Appl. No.: 16/946,194

(22) Filed: Jun. 9, 2020

(65) Prior Publication Data
US 2021/0383373 A1    Dec. 9, 2021

(51) Int. Cl.
*G06Q 20/38* (2012.01)
*G06F 9/451* (2018.01)
*G06Q 20/40* (2012.01)
*H04L 9/32* (2006.01)

(52) U.S. Cl.
CPC ......... *G06Q 20/3821* (2013.01); *G06F 9/451* (2018.02); *G06Q 20/4014* (2013.01); *H04L 9/321* (2013.01)

(58) Field of Classification Search
CPC ............ G06Q 20/3821; G06Q 20/4014; G06F 9/451; H04L 9/321; H04L 51/28; H04L 51/32; H04L 51/22
See application file for complete search history.

(56) References Cited

U.S. PATENT DOCUMENTS

| | | | |
|---|---|---|---|
| 2012/0117626 A1* | 5/2012 | Yates | H04L 63/101 726/4 |
| 2014/0068746 A1 | 3/2014 | Gonzalez Martinez et al. | |
| 2014/0189799 A1* | 7/2014 | Lu | H04L 51/28 726/4 |
| 2020/0106728 A1* | 4/2020 | Grantham | H04L 51/10 |
| 2021/0096887 A1* | 4/2021 | Klein | G06F 9/44505 |

FOREIGN PATENT DOCUMENTS

WO    2021252383    12/2021

OTHER PUBLICATIONS

"International Application Serial No. PCT/US2021/036233, International Search Report dated Sep. 14, 2021", 4 pgs.
"International Application Serial No. PCT/US2021/036233, Written Opinion dated Sep. 14, 2021", 7 pgs.

\* cited by examiner

*Primary Examiner* — Patrick McAtee
*Assistant Examiner* — Vincent I Idiake
(74) *Attorney, Agent, or Firm* — Schwegman Lundberg & Woessner, P.A.

(57) ABSTRACT

Aspects of the present disclosure involve a system and a method for performing operations comprising: receiving, by a messaging application, a request to access a third-party resource; in response to receiving the request, obtaining a user interface data corresponding to the third-party resource; generating, for display on a client device, a graphical user interface of the third-party resource based on the markup-language document; generating for display a menu with an option to authorize the third-party resource to access user data from the messaging application; and authorizing the third-party resource to access the user data from the messaging application in response to a user interaction with the menu.

20 Claims, 14 Drawing Sheets

THIRD-PARTY RESOURCE AUTHORIZATION

TECHNICAL FIELD

The present disclosure relates generally to facilitating interactions between a messaging application and third-party resources.

BACKGROUND

The popularity of users interacting with other users online continues to grow. There are many ways for users to interact online with other users. Users can communicate with their friends using messaging applications and can play with other users online in multiplayer video games or perform other actions using various other applications.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
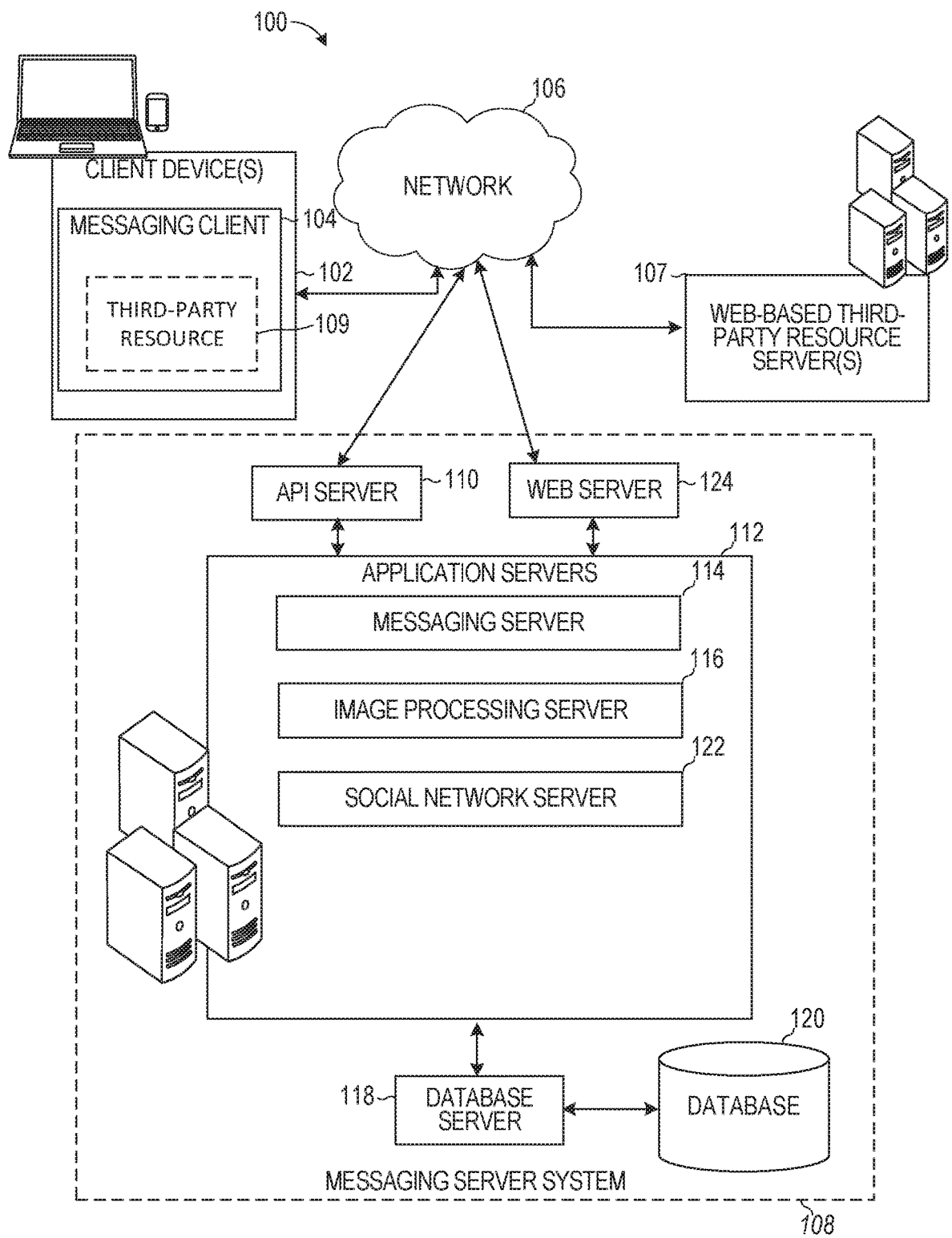
FIG. 1 is a diagrammatic representation of a networked environment in which the present disclosure may be deployed, in accordance with some examples.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Typically, users maintain unique accounts for each application that is installed on their devices. To access a given application, the user has to recall their login credentials and input those credentials into the interface of the given application. After the application validates the credentials, the user gains access to the features of the application. Because of the increasing number of applications users install on their devices, remembering the credentials for each application becomes incredibly burdensome and can be discouraging to users. Sometimes users even write down their credentials for each application, which jeopardizes the user's security if those written down credentials are lost or stolen.

In some instances, a user can access a given application using their account from another application. In these cases, some information is shared between the two applications. In these approaches, the user is not informed about specifically which user data is being shared and exchanged between the various applications. This lack of control puts the user's data at risk of being compromised.

In addition, sometimes users only seek to use certain minimum functions of a given application. To do so, the users have to leave the user interface of an original application and access separately the interface of the given application. Once in the interface of the given application, the users have to navigate various screens to reach the specific feature they are interested in accessing. Then, the users have to further navigate through multiple screens and interfaces to return back to the original application they were using. This process is very tedious and time consuming which ends up frustrating the users and adversely impacts the overall user experience.

The disclosed embodiments improve the efficiency of using the electronic device by providing a multi-application authentication system that provides a user with greater control over sharing authorization or authentication information between multiple applications. Specifically, according to the disclosed examples, a messaging application receives a request to access a third-party resource and in response, the messaging application obtains a markup-language document corresponding to the third-party resource. The messaging application generates for display on a client device a graphical user interface of the third-party resource based on the markup-language document and after the graphical user interface of the third-party resource has been displayed on the client device, the messaging application generates for display a menu with an option to authorize the third-party resource to access user data from the messaging application. The messaging application authorizes the third-party resource to access the user data from the messaging application in response to a user interaction with the menu.

In some cases, after or before authorizing the third-party resource, the graphical user interface of the third-party resource is presented within a graphical user interface of the messaging application. Particularly, because the third-party resource is a web-based resource that is implemented using a markup-language document, features, functions and interfaces of the third-party resource can be presented within the same interface of the messaging application. This avoids the need for the user to navigate to away from a screen of the messaging application (e.g., by closing or exiting the messaging application) to access features of the third-party resource which improves the overall user experience.

In this way, according to the disclosed embodiments, because the authorization of sharing the authentication information of the messaging application with other applications is performed through the messaging application itself, the messaging application is able to track and maintain a list of all the applications with which the authentication information has been shared. The disclosed embodiments improve the efficiency of using the electronic device by reducing the number of screens and interfaces a user has to navigate through to access features of third-party resources (e.g., third-party games, third-party applications and small-scale versions of such applications) figure out which third-party resources are sharing authentication information and enhances the security of the user's credentials. This reduces the device resources (e.g., processor cycles, memory, and power usage) needed to accomplish a task with the device. The third-party resources can be third-party games, third-party applications and small-scale versions of such applications that are provided by an entity or organization that differs from the entity or organization that provides the messaging application.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104. Each messaging client 104 is communicatively coupled to other instances of the messaging client 104 and a messaging server system 108 via a network 106 (e.g., the Internet).

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data).

The messaging client 104 accesses and integrates features and functions of a third-party resource 109 into an interface of the messaging client 104. Particularly, the messaging client 104 receives a user selection of an option to launch or access features of a third-party resource 109 (e.g., a third-party gaming application, a third-party application installed on the client device 102, or a small-scale version of the third-party application that is or is not installed on the client device 102). The small-scale version of the third-party application includes a subset of features and functions of the third-party application (e.g., the full-scale version of the third-party application) and is implemented using a markup-language document. Namely, the small-scale version of the third-party application may be a web-based version of the third-party application. In response to receiving the user selection of the option to launch or access features of the third-party resource 109, the messaging client 104 determines whether the selected third-party resource 109 is a web-based third-party resource (e.g., a web-based gaming application or web-based third-party application) or a locally-installed third-party application. In some cases, third-party application that are locally installed on the client device 102 can be launched independently of and separately from the messaging client 104, such as by selecting an icon from a home screen of the client device 102 corresponding to the third-party application. Small-scale versions of such third-party applications can only be launched or accessed via the messaging client 104. Namely, no portion of the small-scale third-party application can be accessed outside of the messaging client 104. The small-scale third-party application can only be launched by the messaging client 104 receiving the markup-language document associated with the small-scale third-party application and processing such a document.

In response to determining that the third-party resource 109 is a locally-installed third-party application, the messaging client 104 instructs the client device 102 to launch the third-party application by executing locally stored code corresponding to the third-party application. In response to determining that the third-party resource 109 is a web-based resource, the messaging client 104 communicates with the web-based third-party resource server 107 to obtain a markup-language document corresponding to the selected resource. The messaging client 104 then processes the obtained markup-language document to present the web-based third-party resource within a user interface of the messaging client 104.

Specifically, each messaging client 104 is able to communicate with one or more web-based third-party resource server(s) 107. Each web-based third-party resource server 107 hosts, for example, an HTML5 based game or small-scale version of a given third-party application (e.g., utility, payment, or ride sharing application). Particularly, the messaging client 104 launches a web-based resource (game or application) by accessing the HTML5 file from the web-based third-party resource server 107 associated with the web-based resource. In certain embodiments, the games and applications hosted by web-based third-party resource server 107 are programmed in JavaScript leveraging a software development kit (SDK) provided by the messaging server 114. The SDK includes application programming interfaces (APIs) with functions that can be called or invoked by the web-based application. In certain embodiments, the messaging server 114 includes a JavaScript library that provides a given third-party resource access to certain user data of the messaging client 104. HTML5 is used as an example technology for programming games, according to some embodiments, but applications and resources programmed based on other technologies can be used.

In order to integrate the functions of the SDK into the web-based resource, the SDK is downloaded by the web-based third-party resource server 107 from the messaging server 114 or is otherwise received by the web-based third-party resource server 107. Once downloaded or received, the SDK is included as part of the application code of the web-based third-party resource. The code of the web-based resource can then call or invoke certain functions of the SDK to integrate features of the messaging client 104 into the web-based resource.

The SDK stored on the messaging server 114 effectively provides the bridge between the web-based third-party resource and the messaging client 104. This provides the user with a seamless experience of communicating with their friends on the messaging client 104 preserving the look and feel of the messaging client 104 while accessing features of a web-based third-party resource. To bridge communications between the web-based third-party resource and the messaging client 104, in certain embodiments, the SDK facilitates communication between the web-based third-party resource server 107 and the messaging client 104. In certain embodiments, a WebViewJavaScriptBridge running on a client device 102 establishes two one-way communication channels between the web-based resource and the messaging client 104. Messages are sent between the web-based resource and the messaging client 104 via these communication channels asynchronously. Each SDK function invocation is sent as a message and callback for each SDK function is implemented by constructing a unique callback identifier and sending a message with that callback identifier.

By utilizing the SDK, not all of the information from the messaging client 104 is shared with the web-based third-party resource server 107. The SDK limits which information is shared based on the needs of the web-based resource. In certain embodiments, each web-based third-party resource server 107 provides the HTML5 file corresponding to the web-based resource to the messaging server 114. The messaging server 114 can add a visual representation of the web-based resource in the messaging client 104. Once the user selects the visual representation or instructs the messaging client 104 through a GUI of the messaging client 104 to access features of the web-based third-party resource, the messaging client 104 obtains the HTML5 file and initiates all the resources necessary to access the features of the web-based resource.

The messaging client 104 presents a graphical user interface (e.g., a landing page or title screen) of the third-party resource. During, before, or after presenting the landing page or title screen, the messaging client 104 determines whether the launched third-party resource has been previously authorized to access user data of the messaging client 104. In response to determining that the launched third-party resource has been previously authorized to access user data of the messaging client 104, the messaging client 104 presents another graphical user interface of the third-party resource that includes functions and features of the third-party resource. In response to determining that the launched third-party resource has not been previously authorized to access user data of the messaging client 104, after a threshold period of time (e.g., 3 seconds) of displaying the landing page or title screen of the third-party resource, the messaging client 104 slides up (animates a menu as surfacing from a bottom of the screen to a middle of or other portion of the screen) a menu for authorizing the third-party resource to access the user data. The menu identifies the type of user data that the third-party resource will be authorized to use. In response to receiving a user selection of an accept option, the messaging client 104 adds the third-party resource to a list of authorized third-party resources and allows the third-party resource to access user data from the messaging client 104. In some cases, the third-party resource is authorized by the messaging client 104 to access the user data in accordance with an OAuth 2 framework.

The messaging client 104 controls the type of user data that is shared with third-party resources based on the type of third-party resource being authorized. For example, third-party resources that include full-scale third-party applications are provided with access to a first type of user data (e.g., only two-dimensional avatars of users with or without different avatar characteristics). As another example, third-party resources that include small-scale versions of third-party applications (web-based versions of third-party applications) or web-based gaming applications are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120 that stores data associated with messages processed by the application servers 112. Similarly, a web server 124 is coupled to the application servers 112, and provides web-based interfaces to the application servers 112. To this end, the web server 124 processes incoming network requests over the Hypertext Transfer Protocol (HTTP) and several other related protocols.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 114, in view of the hardware requirements for such processing.

The application servers 112 also include an image processing server 116 that is dedicated to performing various image processing operations, typically with respect to images or video within the payload of a message sent from or received at the messaging server 114.

Figure 3:
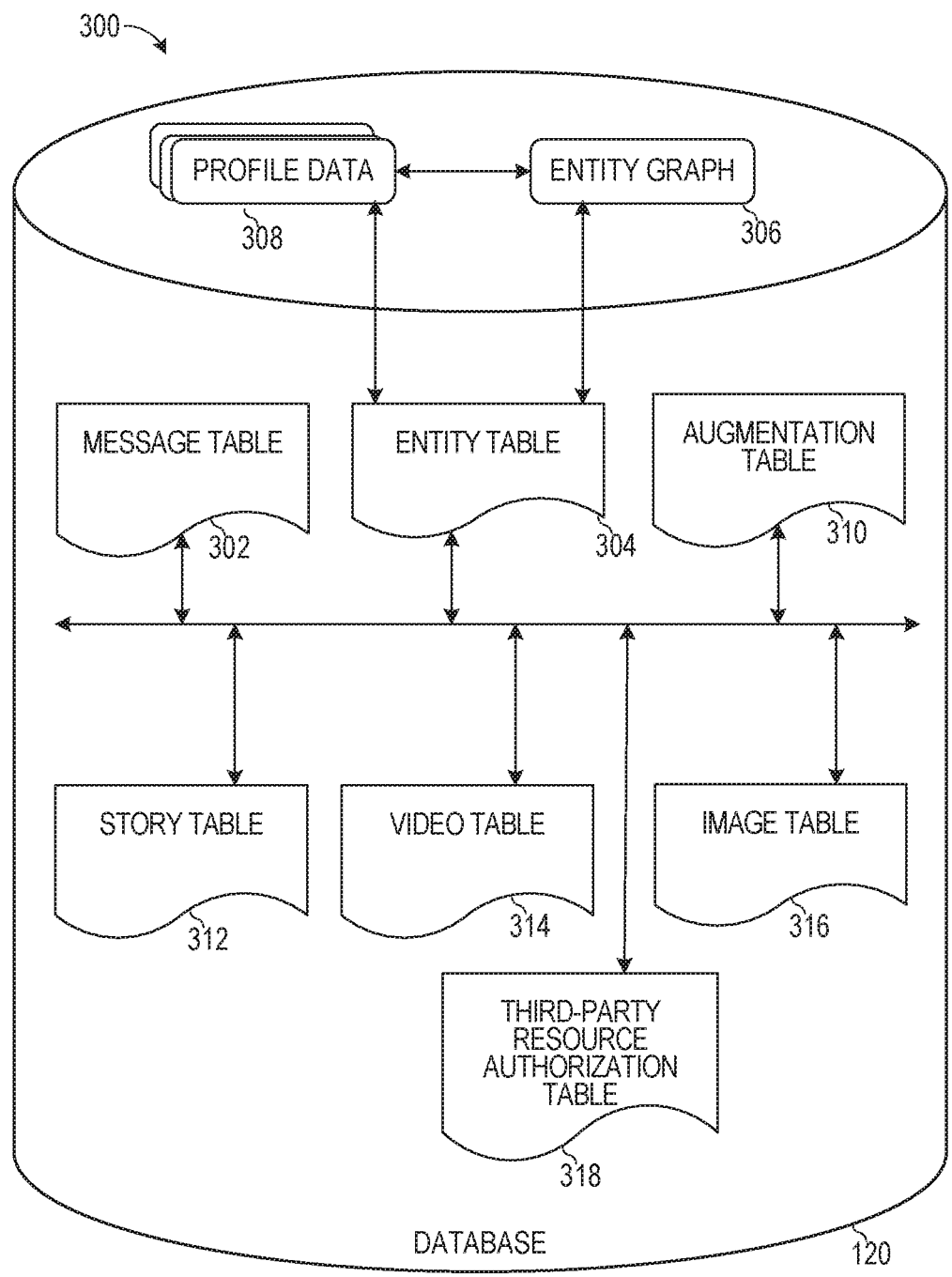
FIG. 3 is a diagrammatic representation of a data structure as maintained in a database, in accordance with some examples.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system 100 with which a particular user has relationships or is "following," and also the identification of other entities and interests of a particular user.

System Architecture

Figure 2:
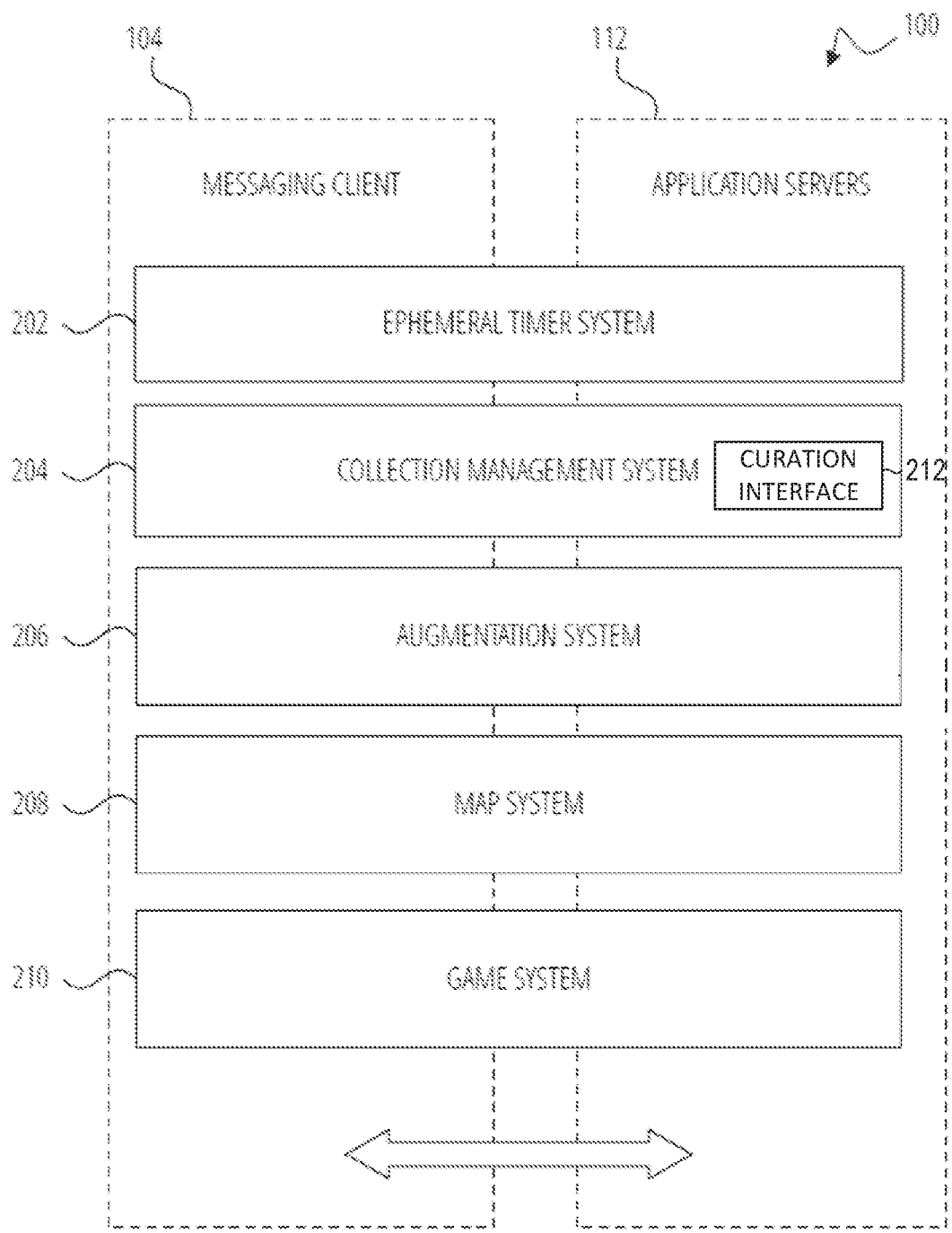
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 112. The messaging system 100 embodies a number of subsystems, which are supported on the client side by the messaging client 104 and on the sever side by the application servers 112. These subsystems include, for example, an ephemeral timer system 202, a collection management system 204, an augmentation system 206, a map system 208, and a game system 210.

The ephemeral timer system 202 is responsible for enforcing the temporary or time-limited access to content by the messaging client 104 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 104 based on a geolocation of the client device 102. In another example, the augmentation system 206 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 208 provides various geographic location functions, and supports the presentation of map-based media content and messages by the messaging client 104. For example, the map system 208 enables the display of user icons or avatars (e.g., stored in profile data 308) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 210 provides various gaming functions within the context of the messaging client 104. The messaging client 104 provides a game interface providing a list of available games (e.g., web-based games or web-based applications) that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The messaging client 104 receives inputs from a touchscreen of client device 102. The messaging client 104 determines whether the inputs from the touchscreen of the client device 102 correspond to interactions by a user with a touchpad component on the back of the device. For example, when multiple positions of the touchscreen are activated simultaneously and that correspond to a particular combination of simultaneously activated positions, the messaging client 104 determines that the touchscreen received inputs from the touchpad component on the back of the client device 102 rather than by direct physical touch to the touchscreen. In some embodiments, a user may toggle an on-screen option that is displayed by the operating system or messaging client 104 to instruct the operating system or messaging client 104 to interpret inputs on the touchscreen as being received from interactions with the touchpad on the back of the device.

When the messaging client 104 or operating system detects (by direct user instructions or by a unique activation of a combination of positions of the touchscreen of the client device 102) that a user is providing inputs to the touchscreen indirectly by interacting with the touchpad on the back of the client device 102, the messaging client 104 or operating system interprets the combination of inputs on the touchscreen to generate a command to control operation of the client device 102. For example, the messaging client 104 determines that one combination of the inputs on the touchscreen that is activated by the user interacting with the touchpad component on the back of the client device 102 corresponds to a scroll down operation. In such cases, the messaging client 104 scrolls the page being displayed on the touchscreen down. As another example, the messaging client 104 determines that a second combination of the inputs on the touchscreen that is activated by the user interacting with the touchpad component on the back of the client device 102 corresponds to a select operation. In such cases, the messaging client 104 instructs an application, such as a game, that is presenting the content on the touchscreen to perform a select operation.

Data Architecture

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any one particular message, at least message sender data, message recipient (or receiver) data, and a payload. Further details regarding information that may be included in a message, and included within the message data stored in the message table 302, is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group.

The database 120 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudo-random animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of objects' elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other examples, other methods and algorithms suitable for face detection can be used. For example, in some embodiments, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape.

Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

Third-party resource authorization table 318 stores a list of all third-party resources (e.g., third-party applications, small-scale versions of third-party applications, such as web-based third-party applications, and web-based gaming applications) that have been authorized to access user data of the messaging client 104. The third-party resource authorization table 318 also stores a timer for each authorized third-party resource that is reset or refreshed each time the corresponding third-party resource is used. Namely, the timer represents frequency or recency of use for each third-party resource. Whenever a user of the messaging client 104 launches or accesses a feature of the third-party resource, the timer for the third-party resource is reset or refreshed. This timer is used to rank the third-party resource by frequency or recency of use to generate a list of the authorized third-party resources. The third-party resource with a smallest value for the timer is positioned first or at the top of the list of authorized third-party resources. In some cases, when the timer for a given third-party resource reaches a threshold value (e.g., 90 days), the corresponding third-party resource is automatically de-authorized (e.g., the authorization for the third-party resource to access the user data is revoked until the user re-authorizes the third-party resource to access the user data of the messaging client 104).

Data Communications Architecture

Figure 4:
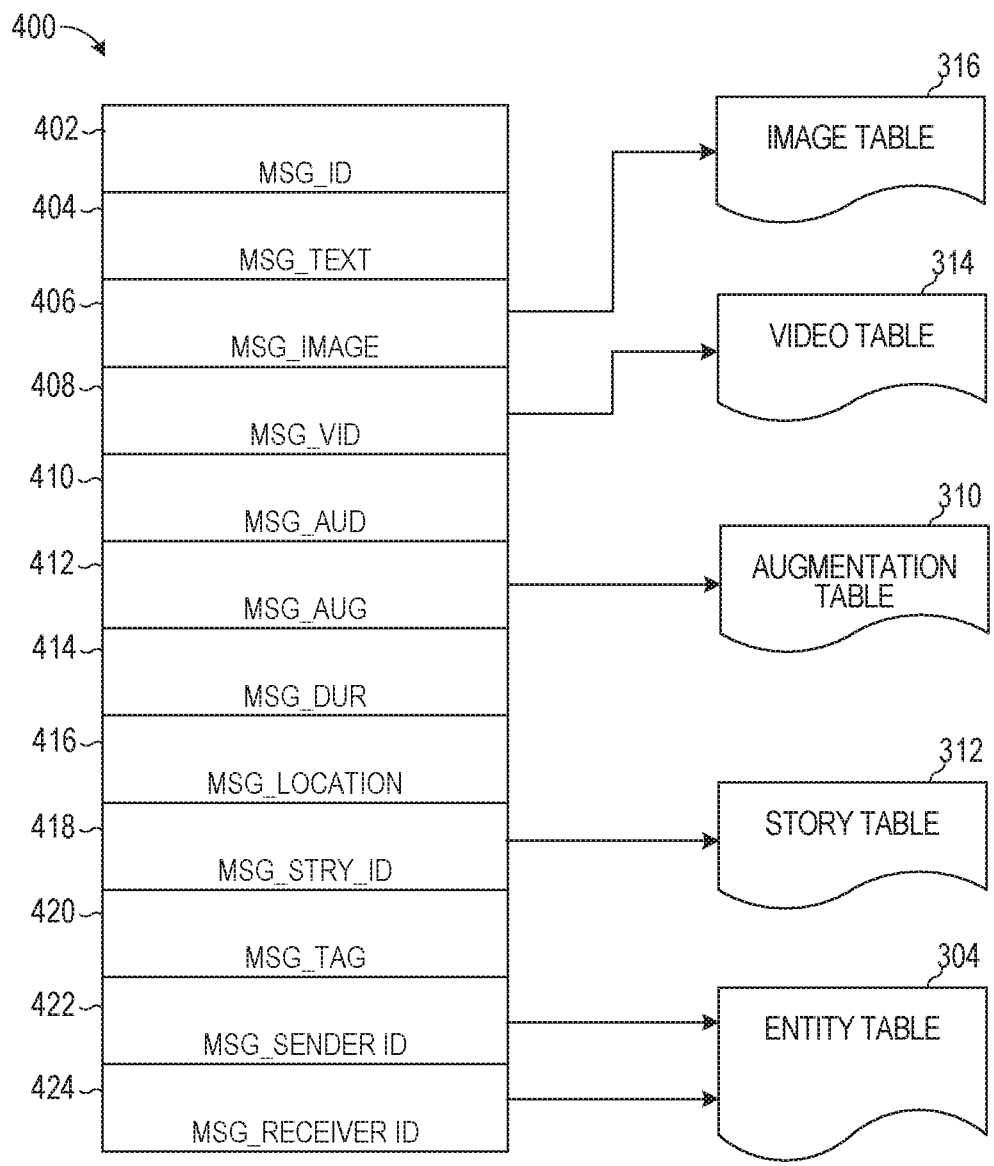
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 114. The content of a particular message 400 is used to populate the message table 302 stored within the database 120, accessible by the messaging server 114. Similarly, the content of a message 400 is stored in memory as "in-transit" or "in-flight" data of the client device 102 or the application servers 112. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 316.
- message video payload 408: video data, captured by a camera component or retrieved from a memory component of the client device 102, and that is included in the message 400. Video data for a sent or received message 400 may be stored in the video table 314.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).
- message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentation data 412 may point to data stored in an augmentation table 310, values stored within the message story identifier 418 may point to data stored in a story table 312, and values stored within the message sender identifier 422 and the message receiver identifier 424 may point to user records stored within an entity table 304.

Figure 5:
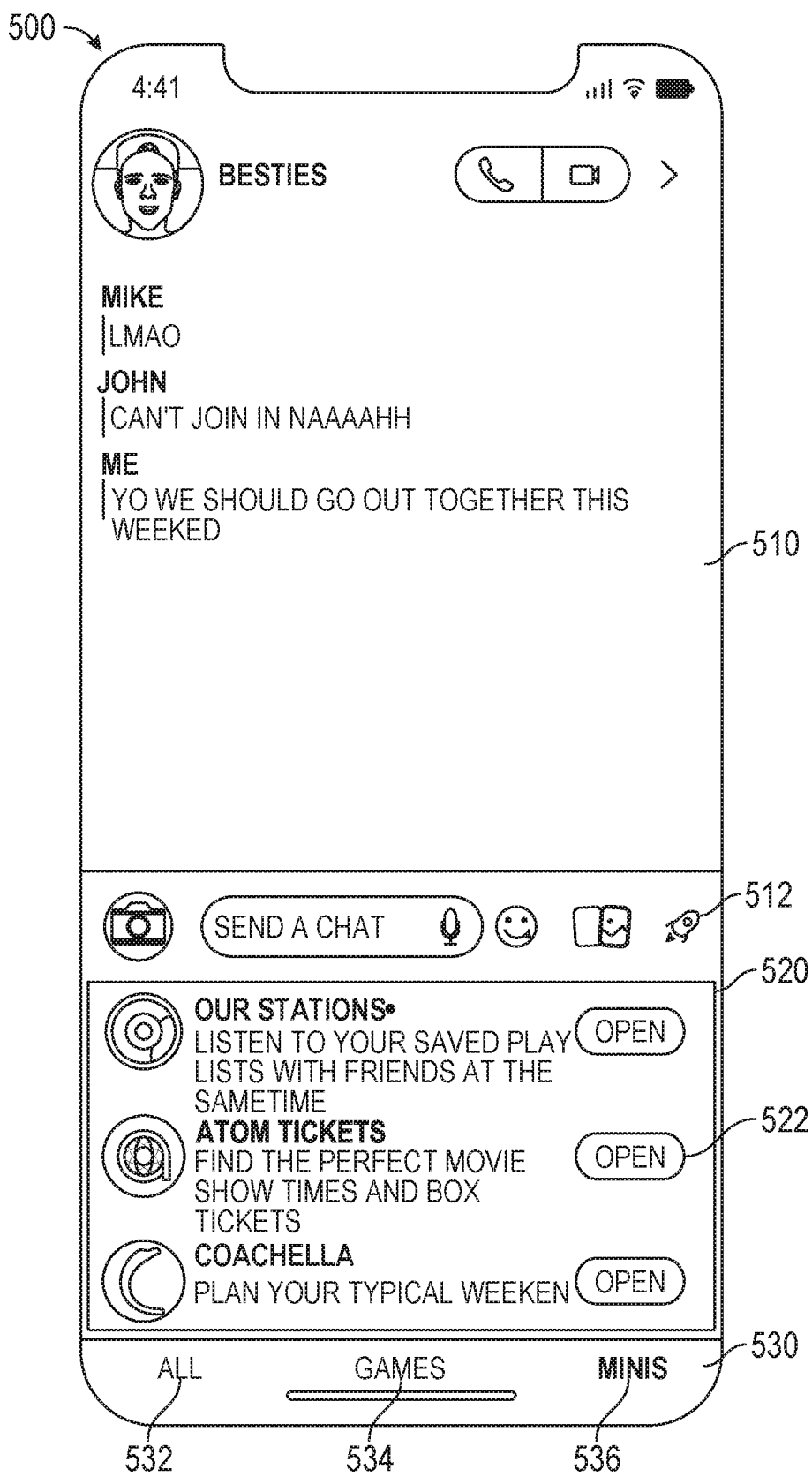
FIGS. 5, 6, 7A, 7B, 8A, 8B, and 9 are diagrammatic representations of graphical user interfaces, in accordance with some examples.

FIGS. 5, 6, 7A, 7B, 8A, 8B, and 9 are diagrammatic representations of graphical user interfaces, in accordance with some examples. As shown in FIG. 5, a graphical user interface 500 of a messaging client 104 is shown. The graphical user interface 500 depicts a conversation interface 510 in which multiple participants exchange messages. Via conversation interface 510, a given user can compose a voice or text message and send the message to all the users that are involved in the conversation. In other embodiments, the graphical user interface 500 may correspond to a search interface for searching content available from the messaging client 104.

The conversation interface 510 includes a resource option 512 that enables a user to launch or access a third-party resource or, in some cases, a first-party resource. A first-party resource is an application or web-application provided by the same entity as that which provides the messaging client 104. A third-party resource is provided by an entity that differs from the entity that provides the messaging client 104. In response to the user selecting the resource option 512, a list 520 of various available resources, such as third-party resources and first-party resources are presented. Each resource presented in the list 520 includes a brief description or summary of the features provided by the resource and a visual representation or icon associated with the resource. The resources presented in the list 520 may be presented in alphabetical order, or a ranked order by popularity or frequency of use.

In some implementations, the conversation interface 510 of the messaging client 104 includes a resource navigation region 530. The resource navigation region 530 allows the user to select between presenting different types of resources in the list 520. For example, the user can select the all option 532. In response to the selection of the all option 532, the list 520 is updated to include a mixture of identifiers for all available third and first-party resources including locally installed full-scale third-party applications, web-based gaming applications, and small-scale versions (web-based versions) of the full-scale third-party applications. As another example, the user can select the games option 534. In response to the selection of the games option 534, the list 520 is updated to only display identifiers of web-based gaming applications. Such a list excludes identifiers of locally-installed third-party applications and small-scale versions of third-party applications. As another example, the user can select the minis option 536. In response to the selection of the minis option 536, the list 520 is updated to only display identifiers of small-scale third and first-party applications. Such a list excludes identifiers of locally-installed third-party applications and web-based gaming applications.

Figure 6:
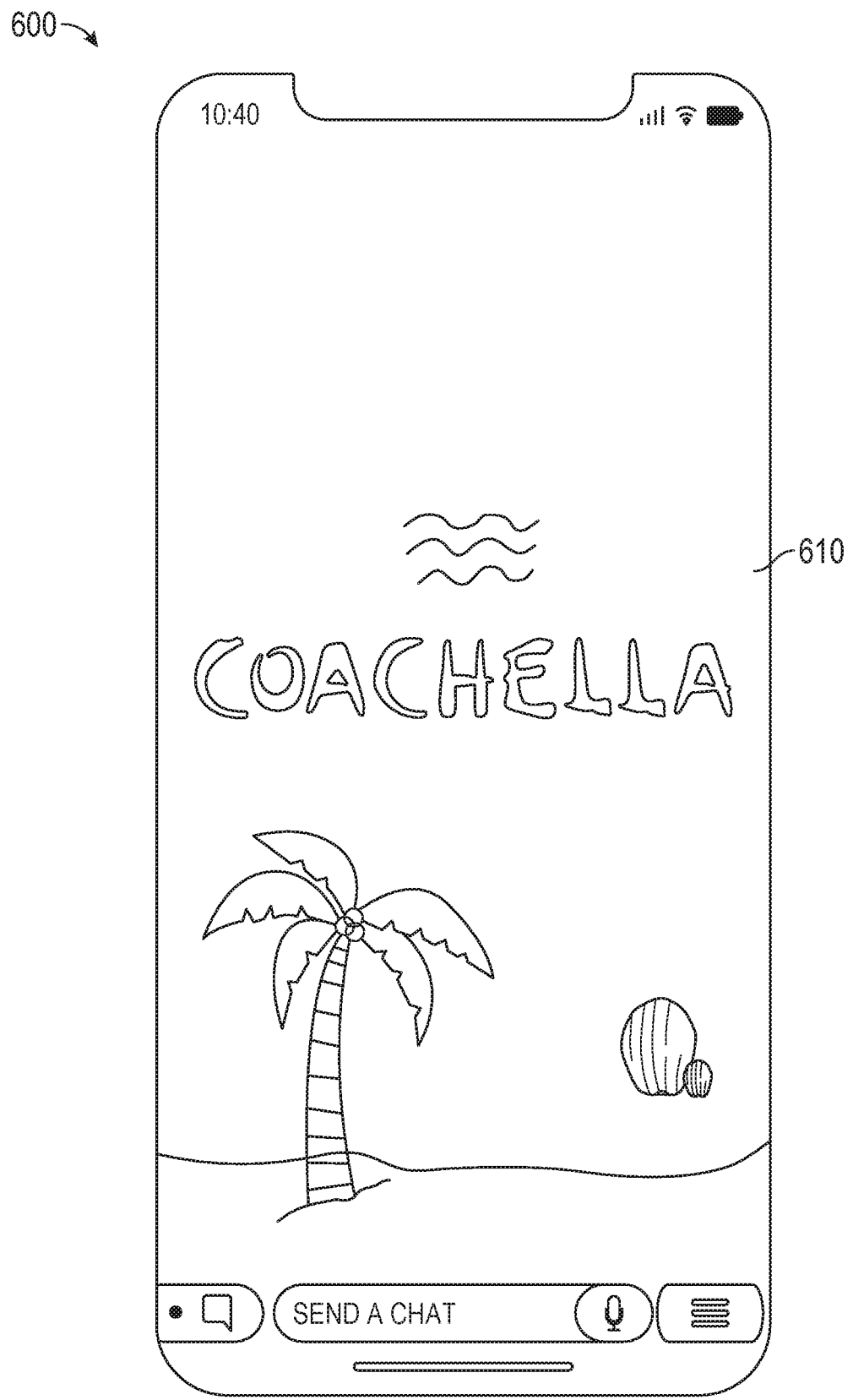

A given resource, such as a third-party web-resource or small-scale version of an application can be launched or accessed by selecting the open option 522. In response to receiving a selection, such as from a user, of the open option 522, the messaging client 104 obtains the markup-language document associated with the corresponding resource and processes the markup-language document to present an interface of the resource. For example, FIG. 6 shows a graphical user interface 600 of a web-based gaming application or web-based small-scale version of an application that is launched responsive to a user interaction with the open option 522. As shown in FIG. 6, the graphical user interface 600 of the web-based gaming application or the web-based small-scale version of an application is presented within the same user interface of the messaging client 104. For example, a bottom portion of the display includes one or more conversation related options (e.g., message composition options) associated with the messaging client 104. The graphical user interface 600 is presented as title screen or landing page 610 of the selected resource independently of whether the given resource is or has been authorized to access user data from the messaging client 104. In some cases, rather than presenting the user interface of the resource in full screen, as shown in FIG. 6, the user interface of the resource can be presented within the list 520. Namely, the messaging client 104 replaces the list 520 with the graphical user interface of the selected resource.

After the title screen or landing page 610 of the selected resource is presented in the graphical user interface 600, the messaging client 104 starts a timer. After, while or before the timer reaches a threshold value (e.g., 3 seconds), the messaging client 104 determines whether the selected resource has previously been authorized to access user data from the messaging client 104. As an example, the messaging client 104 determines whether an identifier of the resource (e.g., a title or serial number) of the third-party resource is included in the third-party resource authorization table 318. If the identifier matches an identifier that is stored in the third-party resource authorization table 318, the messaging client 104 continues to present a graphical user interface with features of the selected resource. For example, the graphical user interface of the selected resource enables the user to perform some function, such as a play a game, purchase items, order a ride, send money, view a concert lineup, view restaurant menus, order food with the selected resource. As another example, the messaging client 104 determines whether the resource is a first-party resource or a third-party resource. If the resource is a first-party resource, the messaging client 104 continues to present a graphical user interface with features of the selected resource without presenting the menu 720 (FIG. 7A).

Figure 7A:
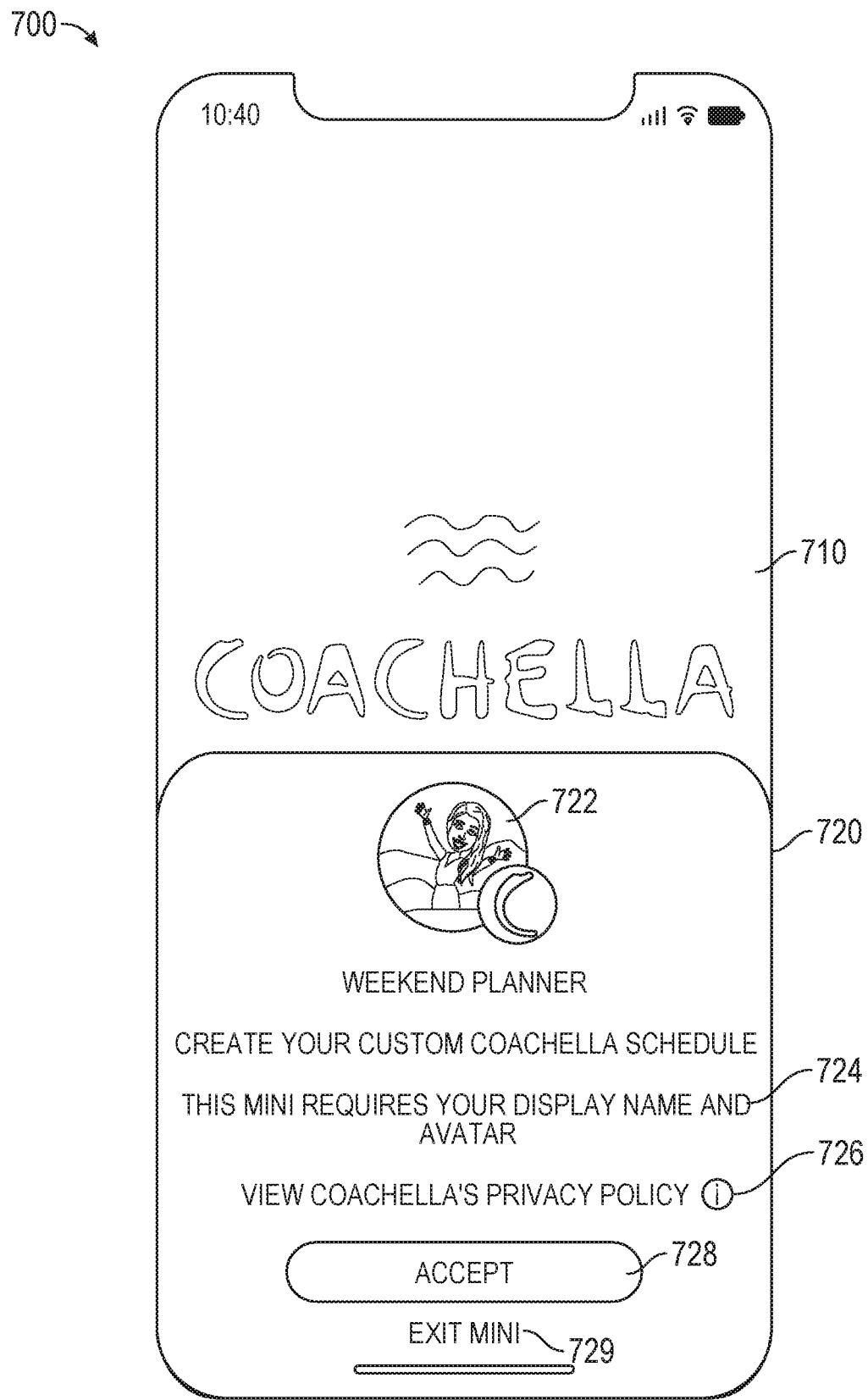
Figure 7B:

If the messaging client 104 determines that the third-party resource is not included in the third-party resource authorization table 318 (e.g., the third-party resource is not authorized to access user data from the messaging client 104), the messaging client 104 presents screen 700 (FIG. 7A). In an embodiment, the screen 700 shown in FIG. 7A is presented after the title screen or landing page of the selected resource has been presented for a threshold period of time (e.g., 3 seconds). The screen 700 includes a menu 720 that allows the user to authorize the third-party resource to access the user data of the messaging client 104. In some cases, the messaging client 104 slides the menu up from a bottom of a screen of the client device 102. Specifically, the messaging client 104 animates the menu 720 as coming from a bottom of the screen of the client device 102 until it reaches a designated position. The menu is presented on a bottom portion the screen and the graphical user interface of the third-party resource remains presented on a top portion of the screen. In some cases, the messaging client 104 reduces an opacity of the graphical user interface 710 of the third-party resource that is displayed while the menu is displayed from a first level of opacity to a second level of opacity. As an example, the background graphical user interface 710 of the third-party resource is made darker relative to the title screen or landing page 610 of the selected resource (shown in FIG. 6) to improve visibility of the menu 720.

The menu 720 includes an icon 722 that represents the third-party resource, an accept option 728, a more information option 726, and an exit option 729. The menu 720 includes a name of the third-party resource that is requesting access to the user data from the messaging client 104. The menu 720 includes a region 724 that specifically lists the type of user data of the messaging client 104 that the third-party resource will access once the third-party resource is authorized. As an example, the third-party resource may access a name of the user, an abbreviated name of the user, one or more types of avatars of the user, payment information, or transaction history of the user or any combination thereof. This information is presented in the region 724. Certain non-user facing data that is provided by the messaging client 104 to the third-party resource may be excluded from the region 724. An example of such data includes an external identifier (ID) that identifies the entity that provides the third-party resource. Another example of such non-user facing data includes an ID token that is used by the backend of the third-party to authenticate requests sent from their applications.

The user can select the more information option 726 to access a screen that includes a description of the third-party resource and of the type of user data that is accessed and how the user data is used. In response to receiving a user selection of the accept option 728, the messaging client 104 performs OAuth 2 authorization with the third-party resource to enable the third-party resource to access the user data for the user from the messaging client 104. The messaging client 104 also adds an identifier of the third-party resource to the third-party resource authorization table 318 in response to the user selection of the accept option 728. After the third-party resource is authorized, the messaging client 104 presents a graphical user interface of the selected resource that enables the user to perform some function, such as a play a game, purchase items, order a ride, send money, view a concert lineup, view restaurant menus, order food with the selected resource. The messaging client 104 also returns the opacity level to the first level (e.g., the same opacity as that shown in FIG. 6) for presenting the graphical user interface of the selected resource that enables the user to perform some function. In response to receiving a user selection of the exit option 729, the messaging client 104 prevents further interaction with the selected resource, prevents sharing user data with the selected resource, and returns the user to the screen 500 in which the list 520 of resources is presented in the conversation interface 510.

The icon 722 is presented based on whether the messaging client 104 determines that the user has previously created an avatar with the messaging client 104. For example, if the messaging client 104 determines that an avatar exists for the user, the messaging client 104 combines an identifier of the selected resource with the avatar and presents the combination of the identifier and the avatar as icon 722. This creates a more personalized experience for the user when deciding whether to authorize the third-party resource. If the messaging client 104 determines that an avatar does not exist for the user, the messaging client 104 obtains the identifier for the third-party resource and presents the identifier as icon 722. Specifically, the messaging client 104 presents a screen 701 (FIG. 7B) that includes the identifier 730 as the icon 722. All other portions shown in screen 701 are similar to that discussed in connection with screen 700.

In some implementations, if the resource is a web-based gaming application, after the user authorizes the web-based gaming application to access the user data from the messaging client 104, a gaming interface of the gaming application is presented. The gaming interface allows the user to start a game in the gaming application. The gaming application may include a leaderboard that is managed by the gaming application or by the messaging client 104. In such cases, the web-based gaming application may present a pop-up window that requests the user to provide further authorization to access a leaderboard managed by the messaging client 104. Specifically, the pop-up window includes a message that informs the user that the user and the user's friends can compare scores with leaderboards. If the user provides further authorization to access the leaderboards, the web-based gaming application is authorized to share the user's score with friends of the user via the messaging client 104.

Figure 8A:
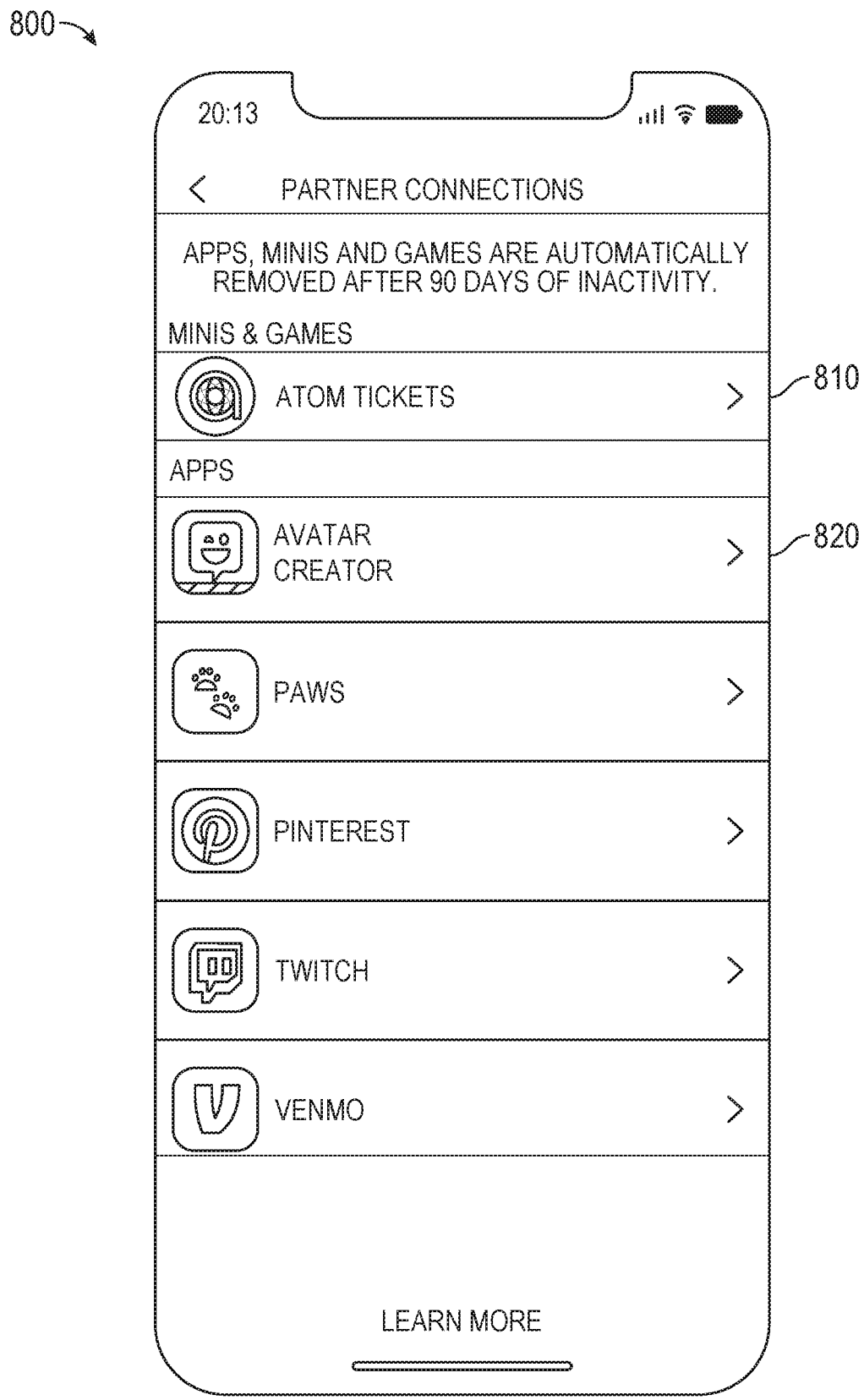
Figure 8B:
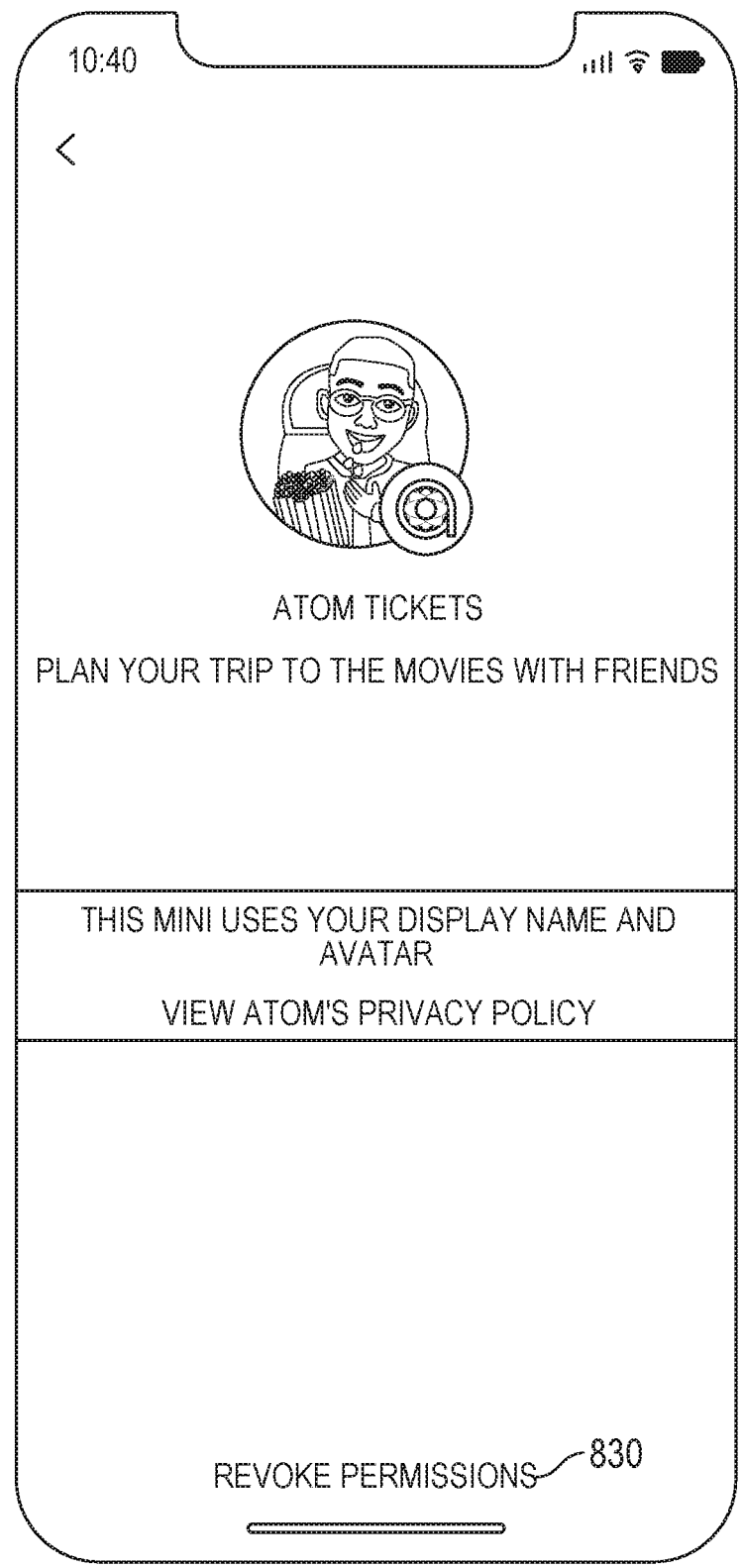

FIG. 8A shows a screen 800 with a graphical user interface of the messaging client 104 for selectively controlling authorizations with third-party resources. The screen 800 includes a first portion 810 and a second portion 820. The first portion 810 lists or provides access to a list of web-based resources (e.g., web-based gaming applications and web-based small-scale versions of applications) that have previously been authorized to access user data from the messaging client 104. The second portion 820 lists or provides access to a list of locally-installed third-party applications that have previously been authorized to access user data from the messaging client 104. For example, when the user selects the accept option 728, the resource identified in the menu 720 is added to the corresponding list in the first portion 810 or the second portion 820. The user can select a given resource that is displayed in screen 800.

The resources listed in the respective first and second portions 810 and 820 are sorted and ranked by frequency or recency of use. Namely, resources that were used more recently, as determined by the timer stored in the third-party resource authorization table 318, are presented at the top of the list and those used less recently are presented at the bottom of the list. For example, a first resource of the resources listed in the first portion 810 that has been used more recently than a second resource in the resources listed in the first portion 810 is presented more prominently or in a higher order or earlier position than the second resource. Similarly, a third resource of the resources listed in the second portion 820 that has been used more recently than a fourth resource in the resources listed in the second portion 820 is presented more prominently or in a higher order or earlier position than the fourth resource. In some cases, only the resources listed in the first portion 810 are ranked and sorted by frequency or recency of use and those that are displayed in the second portion 820 are listed alphabetically. Alternatively, only the resources listed in the second portion 820 are ranked and sorted by frequency or recency of use and those that are displayed in the first portion 810 are listed alphabetically.

In response to the user selecting a given resource that is displayed in screen 800, a screen 801 (FIG. 8B) is presented. Screen 801 includes information associated with the selected resource. Such information includes the same or similar information as that provided in menu 720. For example, the information identifies the resource by name and lists the type of user data that the resource accesses. The screen 801 includes an icon that is based on whether the user has previously generated an avatar with the messaging client 104. If the user previously generated the avatar, the icon shown in screen 801 includes a combination of the avatar and a representation of the resource (similar to icon 722). If the user has not previously generated an avatar, the icon shown in screen 801 includes only a representation of the resource (similar to identifier 730). Screen 801 may include the timer stored in the third-party resource authorization table 318 representing the frequency or recency of use.

Screen 801 includes a revoke permissions option 830. In response to receiving a user selection of the revoke permissions option 830, the messaging client 104 prevents the resource identified in screen 801 from further accessing the user data of the messaging client 104. Also, the identifier for the resource is removed from the lists shown in screen 800 in response to the user selection of the revoke permissions option 830. If the user subsequently launches or accesses the resource that has had the authorization revoked, such as by selecting the open option 522, the messaging client 104 allows the user to re-authorize the resource to access the user data by presenting the menu 720 with accept option 728.

Figure 9:
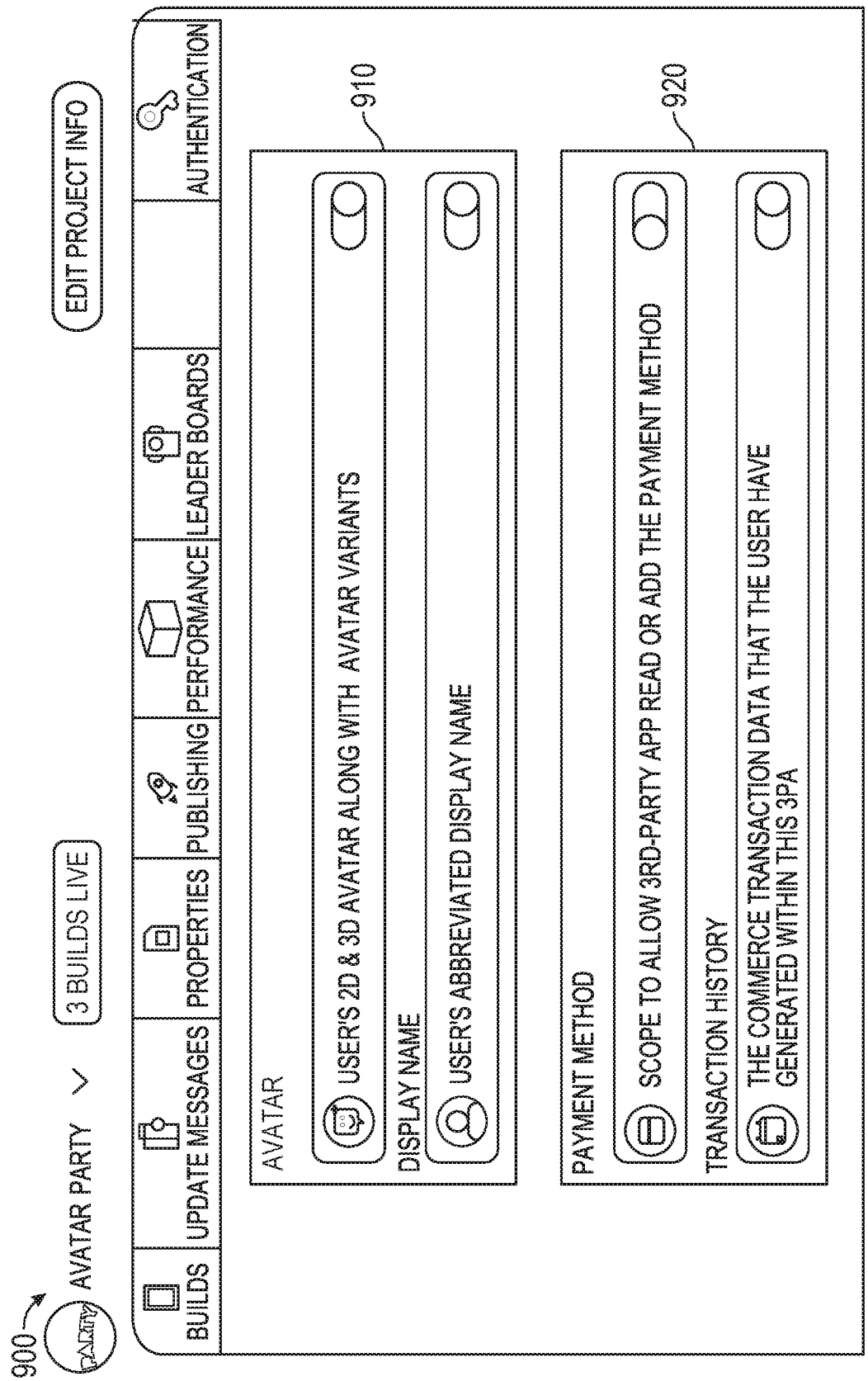

FIG. 9 shows a screen 900 with a graphical user interface presented to a developer of a small-scale version of a third-party application. The screen 900 includes a first region 910 and a second region 920. The first region 910 includes a set of user data that is shared with the third-party resource by default. Such user data includes one or more user avatars (e.g., 2D or 3D avatars) and an abbreviated display name of the user. The second region 920 includes a set of user data that the developer can select to enable to obtain from the messaging client 104. Such user data includes payment information and commerce transaction data that the user has generated with the third-party resource. All of the user data that is enabled as being used and requested by the third-party resource is identified to the user in the menu 720 so the user can intelligently decide whether or not to authorize the third-party resource to obtain this user data from the messaging client 104.

Figure 10:
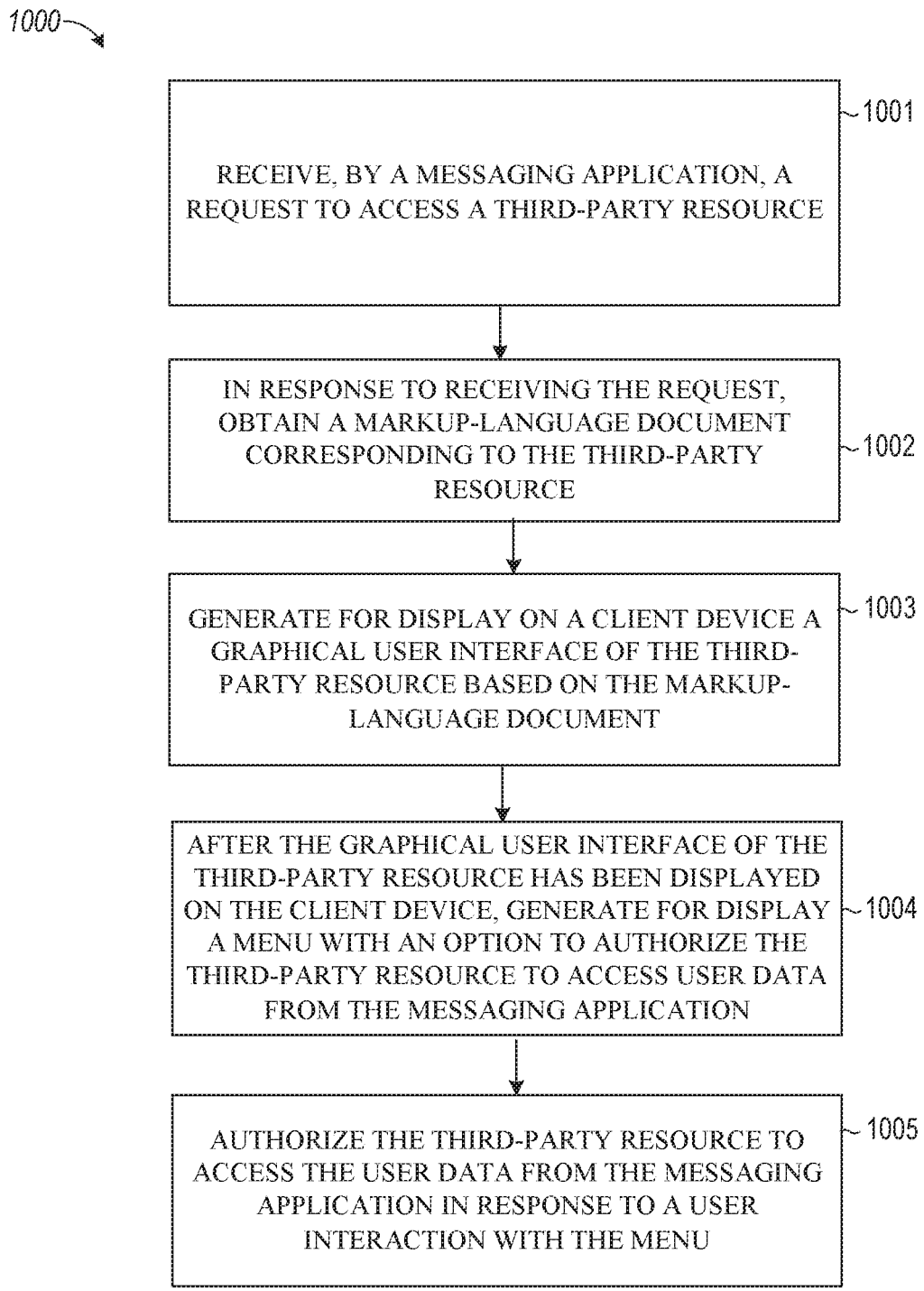
FIG. 10 is a flowchart illustrating example operations of the messaging application, according to example embodiments.

FIG. 10 is a flowchart illustrating example operations of the messaging client 104 in performing process 1000, according to example embodiments. The process 1000 may be embodied in computer-readable instructions for execution by one or more processors such that the operations of the process 1000 may be performed in part or in whole by the functional components of the client device 102; accordingly, the process 1000 is described below by way of example with reference thereto. However, in other embodiments at least some of the operations of the process 1000 may be deployed on various other hardware configurations, such as on application servers 112. The operations in the process 1000 can be performed in any order, in parallel, or may be entirely skipped and omitted At operation 1001, the client device 102 receives, by a messaging application, a request to access a third-party resource. For example, the messaging client 104 receives a user selection of the open option 522 (FIG. 5).

At operation 1002, the client device 102 obtains a markup-language document corresponding to the third-party resource. For example, in response to receiving the user selection of the open option 522 for a web-based resource (e.g., small-scale version of a third-party application), the messaging client 104 obtains a markup-language document from the web-based third-party resource server 107 associated with the web-based resource (FIG. 1).

At operation 1003, the client device 102 generates for display a graphical user interface of the third-party resource based on the markup-language document. For example, the messaging client 104 presents the title screen or landing page 610 of the selected resource.

At operation 1004, the client device 102, after the graphical user interface of the third-party resource has been displayed, generates for display a menu with an option to authorize the third-party resource to access user data from the messaging application. For example, after the title screen or landing page 610 of the selected resource is presented for three seconds, the messaging client 104 presents the menu 720 (FIG. 7A).

At operation 1005, the client device 102 authorizes the third-party resource to access the user data from the messaging application in response to a user interface with the menu. For example, in response to receiving a user selection of the accept option 728 from the menu 720, the messaging client 104 provides user data to the selected resource and adds the selected resource to the third-party resource authorization table 318 (FIG. 3).

Machine Architecture

Figure 11:
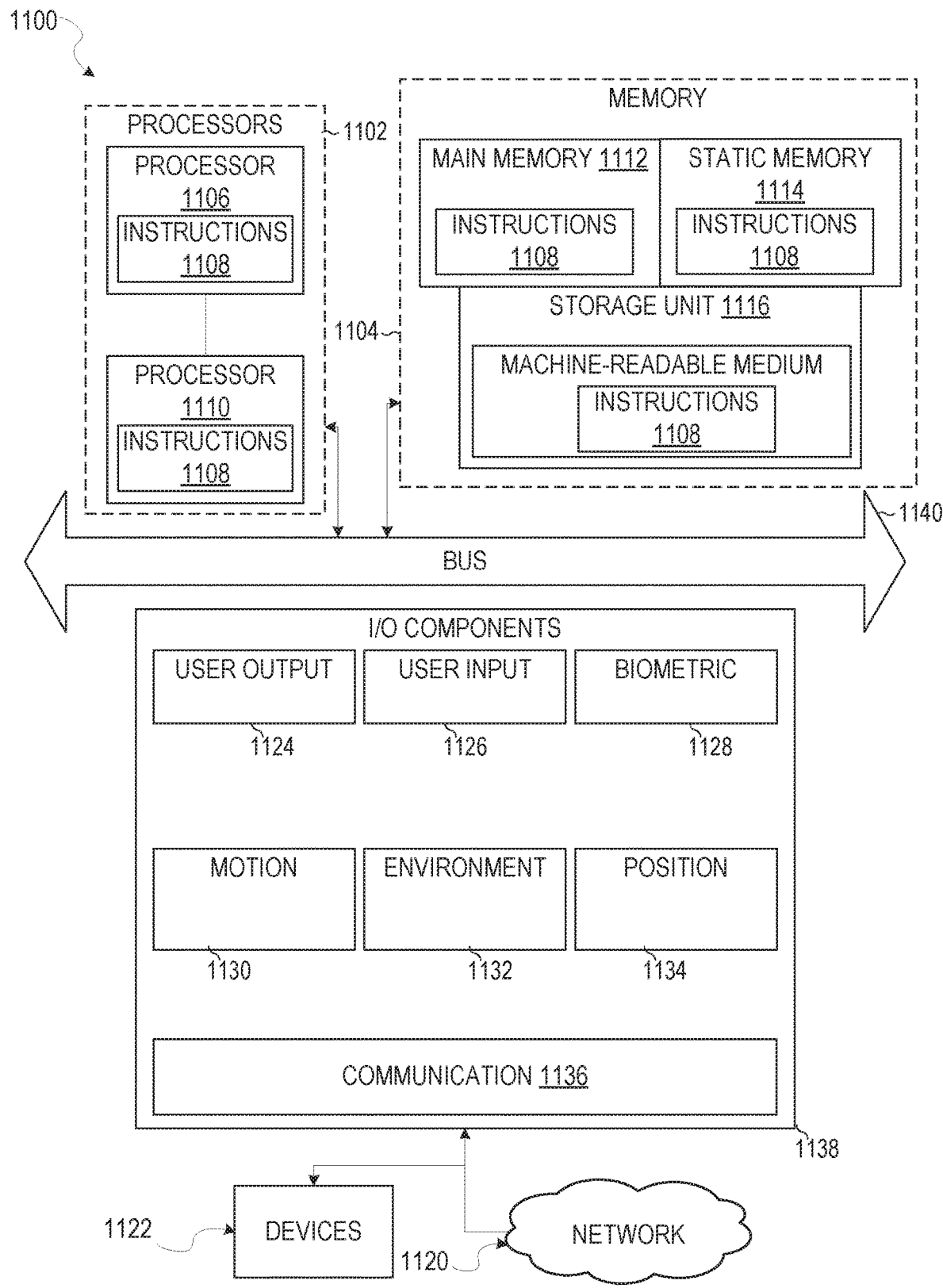
FIG. 11 is a diagrammatic representation of a machine in the form of a computer system within which a set of instructions may be executed for causing the machine to perform any one or more of the methodologies discussed herein, in accordance with some examples.

FIG. 11 is a diagrammatic representation of the machine 1100 within which instructions 1108 (e.g., software, a program, an application, an applet, an app, or other executable code) for causing the machine 1100 to perform any one or more of the methodologies discussed herein may be executed. For example, the instructions 1108 may cause the machine 1100 to execute any one or more of the methods described herein. The instructions 1108 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1108, sequentially or otherwise, that specify actions to be taken by the machine 1100. Further, while only a single machine 1100 is illustrated, the term "machine" shall also be taken to include a collection of machines that individually or jointly execute the instructions 1108 to perform any one or more of the methodologies discussed herein. The machine 1100, for example, may comprise the client device 102 or any one of a number of server devices forming part of the messaging server system 108. In some examples, the machine 1100 may also comprise both client and server systems, with certain operations of a particular method or algorithm being performed on the server-side and with certain operations of the particular method or algorithm being performed on the client-side.

The machine 1100 may include processors 1102, memory 1104, and input/output (I/O) components 1138, which may be configured to communicate with each other via a bus 1140. In an example, the processors 1102 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1106 and a processor 1110 that execute the instructions 1108. The term "processor" is intended to include multi-core processors that may comprise two or more independent processors (sometimes referred to as "cores") that may execute instructions contemporaneously. Although FIG. 11 shows multiple processors 1102, the machine 1100 may include a single processor with a single-core, a single processor with multiple cores (e.g., a multi-core processor), multiple processors with a single core, multiple processors with multiples cores, or any combination thereof.

The memory 1104 includes a main memory 1112, a static memory 1114, and a storage unit 1116, all accessible to the processors 1102 via the bus 1140. The main memory 1104, the static memory 1114, and the storage unit 1116 store the instructions 1108 embodying any one or more of the methodologies or functions described herein. The instructions 1108 may also reside, completely or partially, within the main memory 1112, within the static memory 1114, within machine-readable medium 1118 within the storage unit 1116, within at least one of the processors 1102 (e.g., within the processor's cache memory), or any suitable combination thereof, during execution thereof by the machine 1100.

The I/O components 1138 may include a wide variety of components to receive input, provide output, produce output, transmit information, exchange information, capture measurements, and so on. The specific I/O components 1138 that are included in a particular machine will depend on the type of machine. For example, portable machines such as mobile phones may include a touch input device or other such input mechanisms, while a headless server machine will likely not include such a touch input device. It will be appreciated that the I/O components 1138 may include many other components that are not shown in FIG. 11. In various examples, the I/O components 1138 may include user output components 1124 and user input components 1126. The user output components 1124 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1138 may include biometric components 1128, motion components 1130, environmental components 1132, or position components 1134, among a wide array of other components. For example, the biometric components 1128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1130 include acceleration sensor components (e.g., accelerometer), gravitation sensor components, rotation sensor components (e.g., gyroscope).

The environmental components 1132 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 3600 camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera, and a depth sensor, for example.

The position components 1134 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1138 further include communication components 1136 operable to couple the machine 1100 to a network 1120 or devices 1122 via respective coupling or connections. For example, the communication components 1136 may include a network interface component or another suitable device to interface with the network 1120. In further examples, the communication components 1136 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1122 may be another machine or any of a wide variety of peripheral devices (e.g., a peripheral device coupled via a USB).

Moreover, the communication components 1136 may detect identifiers or include components operable to detect identifiers. For example, the communication components 1136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1136, such as location via Internet Protocol (IP) geolocation, location via Wi-Fi® signal triangulation, location via detecting an NFC beacon signal that may indicate a particular location, and so forth.

The various memories (e.g., main memory 1112, static memory 1114, and memory of the processors 1102) and storage unit 1116 may store one or more sets of instructions and data structures (e.g., software) embodying or used by any one or more of the methodologies or functions described herein. These instructions (e.g., the instructions 1108), when executed by processors 1102, cause various operations to implement the disclosed examples.

The instructions 1108 may be transmitted or received over the network 1120, using a transmission medium, via a network interface device (e.g., a network interface component included in the communication components 1136) and using any one of several well-known transfer protocols (e.g., hypertext transfer protocol (HTTP)). Similarly, the instructions 1108 may be transmitted or received using a transmission medium via a coupling (e.g., a peer-to-peer coupling) to the devices 1122.

Software Architecture

Figure 12:
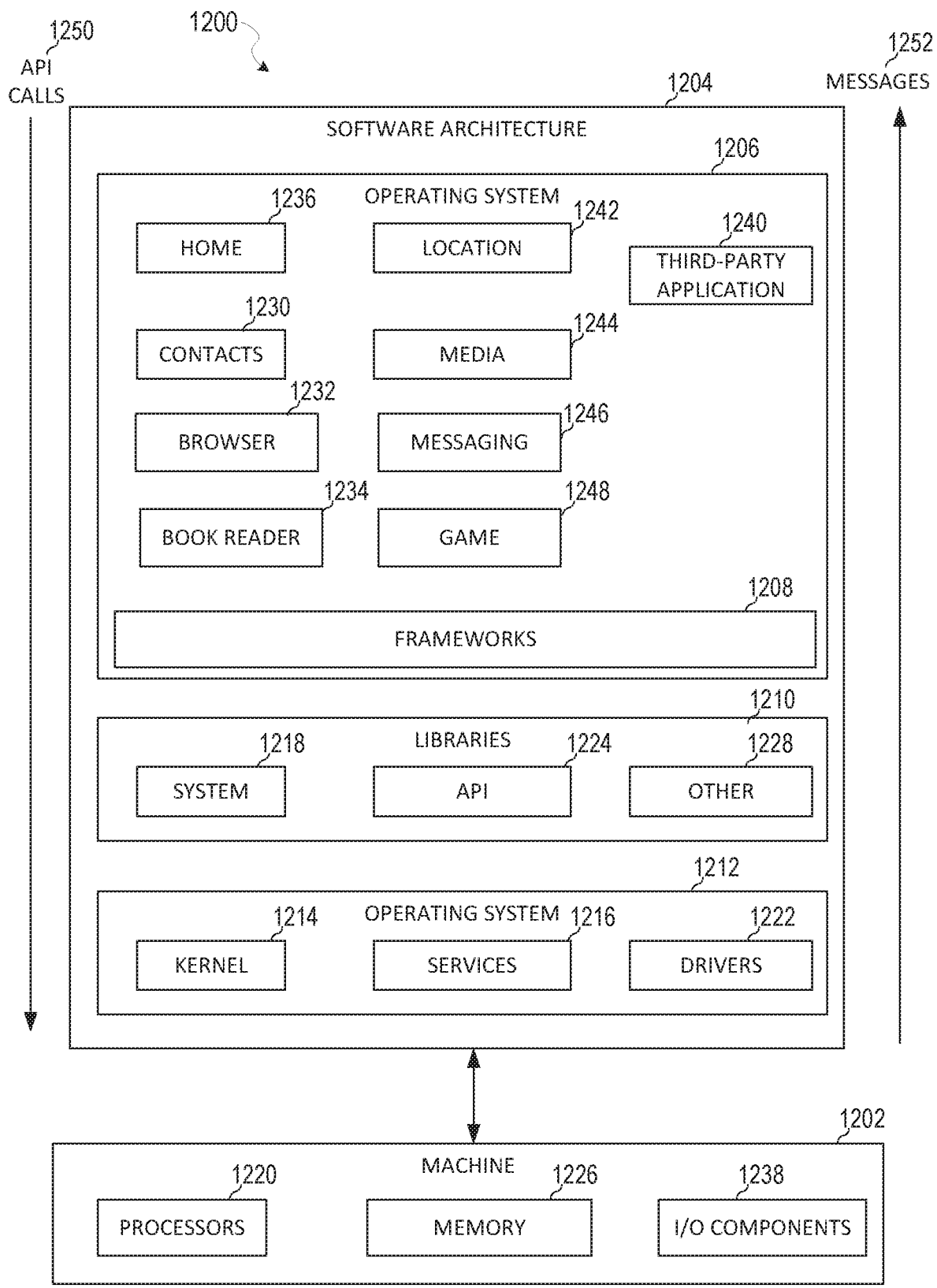
FIG. 12 is a block diagram showing a software architecture within which examples may be implemented.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and I/O components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionality. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1210 provide a common low-level infrastructure used by the applications 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a common high-level infrastructure that is used by the applications 1206. For example, the frameworks 1208 provide various graphical user interface (GUI) functions, high-level resource management, and high-level location services. The frameworks 1208 can provide a broad spectrum of other APIs that can be used by the applications 1206, some of which may be specific to a particular operating system or platform.

In an example, the applications 1206 may include a home application 1236, a contacts application 1230, a browser application 1232, a book reader application 1234, a location application 1242, a media application 1244, a messaging application 1246, a game application 1248, and a broad assortment of other applications such as a third-party application 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the third-party application 1240 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1240 can invoke the API calls 1250 provided by the operating system 1212 to facilitate functionality described herein.

GLOSSARY

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1102 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
receiving, by a messaging application, a request to access a third-party resource;
in response to receiving the request, obtaining a user interface data corresponding to the third-party resource;
generating, for display on a client device, a graphical user interface of the third-party resource based on a markup-language document;
generating for display a menu with an option to authorize the third-party resource to access user data from the messaging application; and
authorizing the third-party resource to access the user data from the messaging application in response to a user interaction with the menu.

2. The method of claim 1, wherein the interface data comprises a markup-language document, further comprising determining, by the messaging application, that the third-party resource lacks authorization to access the user data, wherein the menu is displayed on the client device in response to determining that the third-party resource lacks authorization to access the user data, wherein the menu is generated for display after the graphical user interface of the third-party resource has been displayed on the client device.

3. The method of claim 1, further comprising:
determining that a threshold amount of time has elapsed since the graphical user interface has been generated for display on the client device; and
causing the menu to be generated for display in response to determining that the threshold amount of time has elapsed since the graphical user interface has been generated for display on the client device.

4. The method of claim 1, wherein the generating for display of the menu comprises:
sliding the menu up from a bottom of a screen of the client device, wherein the menu is presented on a bottom portion the screen and the graphical user interface of the third-party resource is presented on a top portion of the screen; and
reducing an opacity of the graphical user interface of the third-party resource that is displayed while the menu is displayed from a first level of opacity to a second level of opacity.

5. The method of claim 4, further comprising:
receiving a user selection of the option to authorize the third-party resource to access the user data from the messaging application;
authorizing the third-party resource to access the user data from the messaging application;
removing the menu from the display in response to receiving the user selection of the option to authorize the third-party resource to access the user data from the messaging application; and
increasing the opacity of the graphical user interface of the third-party resource that is displayed from the second level of opacity to the first level of opacity.

6. The method of claim 1,
wherein the menu includes a description of the user data associated with the user interaction.

7. The method of claim 1, further comprising:
determining that the third-party resource has been unused for a threshold period of time; and
preventing the third-party resource from accessing the user data in response to determining that the third-party resource has been unused for a threshold period of time.

8. The method of claim 7, wherein the third-party resource is authorized in accordance with an OAuth 2 framework.

9. The method of claim 1, further comprising:
determining that the user data which the third-party resource requests access to includes an avatar of the user; and
in response to determining that the user data includes the avatar of the user, displaying an icon that includes the avatar of the user in the menu.

10. The method of claim 9, further comprising:
determining that the avatar has not been previously generated for the user;
in response to determining that the avatar has not been previously generated for the user, displaying a representation of the third-party resource as the icon instead of the avatar.

11. The method of claim 1, wherein the user data includes a two-dimensional avatar of the user, a three-dimensional avatar of the user, and a plurality of versions of an avatar of the user.

12. The method of claim 11, wherein the user data further includes a name of the user, an abbreviated name of the user, payment information for the user, and third-party transaction information for the user.

13. The method of claim 1, wherein the third-party resource comprises small-scale version of a third-party application, further comprising:
authorizing the third-party application separately from the small-scale version of the third-party application, wherein the third-party application is authorized to access a first type of user data from the messaging application, and wherein the small-scale version of the third-party application is authorized to access a second type of user data from the messaging application.

14. The method of claim 13, wherein the first type of user data comprises a two-dimensional avatar of the user, and wherein the second type of user data comprises the two-dimensional avatar of the user, a three-dimensional avatar of the user, and a plurality of versions of an avatar of the user.

15. The method of claim 1, further comprising:
generating for display, by the messaging application, a graphical user interface of the messaging application representing third-party resources that have been authorized to access the user data from the messaging application, the graphical user interface comprising a first portion that includes markup-language based third-party resources that have been authorized to access the user data, and the graphical user interface comprising a second portion that includes third-party applications that have been authorized to access the user data.

16. The method of claim 15, wherein the first portion includes third-party games and small-scale versions of the third-party applications.

17. The method of claim 15, further comprising ranking the third-party resources by recency of being authorized to access the user data, wherein the third-party resources are represented according to the ranking.

18. The method of claim 15, further comprising receiving a user selection of an option to revoke authorization to a given one of the third-party resources from the graphical user interface of the messaging application.

19. A system comprising: a processor configured to perform operations comprising:
receiving, by a messaging application, a request to access a third-party resource;
in response to receiving the request, obtaining a user interface data corresponding to the third-party resource;
generating, for display on a client device, a graphical user interface of the third-party resource based on a markup-language document;
generating for display a menu with an option to authorize the third-party resource to access user data from the messaging application; and
authorizing the third-party resource to access the user data from the messaging application in response to a user interaction with the menu.

20. A non-transitory machine-readable storage medium that includes instructions that, when executed by one or more processors of a machine, cause the machine to perform operations comprising:
receiving, by a messaging application, a request to access a third-party resource;
in response to receiving the request, obtaining a user interface data corresponding to the third-party resource;
generating, for display on a client device, a graphical user interface of the third-party resource based on a markup-language document;
generating for display a menu with an option to authorize the third-party resource to access user data from the messaging application; and
authorizing the third-party resource to access the user data from the messaging application in response to a user interaction with the menu.

* * * * *